United States Patent [19]
McGregor

[11] Patent Number: 5,109,894
[45] Date of Patent: May 5, 1992

[54] VERTICAL BOTTOM-FILL AUGER ASSEMBLY

[76] Inventor: Harold R. McGregor, 216 S. Grove, Owatonna, Minn. 55060

[21] Appl. No.: 704,887

[22] Filed: May 23, 1991

Related U.S. Application Data

[60] Division of Ser. No. 559,629, Jul. 30, 1990, Pat. No. 5,042,539, which is a continuation-in-part of Ser. No. 270,845, Nov. 14, 1988, Pat. No. 4,944,334.

[51] Int. Cl.$^5$ .............................................. B65B 1/14
[52] U.S. Cl. ...................... 141/83; 141/114; 141/71; 141/59; 141/128; 141/256; 141/276; 222/55; 222/77
[58] Field of Search .............. 141/83, 59, 67, 68, 141/69, 71-80, 114, 128, 256, 257, 275, 276, 10, 12; 222/55, 56, 63, 71, 77

[56] References Cited

U.S. PATENT DOCUMENTS

| | | | |
|---|---|---|---|
| 2,778,387 | 1/1957 | Diehl | 141/59 X |
| 3,191,642 | 6/1965 | Saito | 141/128 |
| 3,305,133 | 2/1967 | Parker | 222/643 |
| 3,369,578 | 2/1968 | Lampert | 141/235 |
| 3,664,385 | 5/1972 | Carter | 141/12 |
| 4,164,244 | 8/1979 | Meier | 141/156 |
| 4,185,669 | 1/1980 | Jevakohoff | 141/59 |
| 4,381,545 | 4/1987 | Biddle, III et al. | 141/128 |
| 4,633,923 | 1/1987 | Hinzmann | 141/116 |
| 4,688,610 | 5/1987 | Campbell | 141/83 |
| 4,696,329 | 9/1987 | Izzi | 141/1 |
| 4,805,673 | 2/1989 | Wohrle et al. | 141/10 |
| 4,821,782 | 4/1989 | Hyer | 141/83 |
| 4,944,334 | 7/1990 | McGregor | 141/71 |
| 5,042,539 | 8/1991 | McGregor | 141/114 |

*Primary Examiner*—Ernest G. Cusick
*Attorney, Agent, or Firm*—Moore & Hansen

[57] ABSTRACT

A vertical bottom-fill auger assembly including a bottom-fill auger bowl containing an internal rotating agitator or wiper element, and a vertical moving carriage or bag handling mechanism including a traveling bag settler. The vertical movement of the carriage or bag handling mechanism may be adjusted in response to the vertical auger revolution rate, the product density or weight as measured by a bulk or net weigh scale attached to the bag support assembly, or to comport to a premeasured charge that is bulk loaded into the auger bowl. The agitator or wiper may be of a configuration having a blade mounted on a rotating shaft vertically disposed in the center of the auger bowl, or may be carried on a rotating ring horizontally disposed at or near the top of the auger bowl. The traveling bag settler includes an arm which may be oscillated in a vertical plane to strike the bottom of a bag being filled, and which travels with the bag as it descends during filling and when lowered to a conveyor. The conveyor is split to form two spaced-apart tracks with the arm of the bag settler being received between the tracks when the bag and bag settler are lowered.

7 Claims, 7 Drawing Sheets

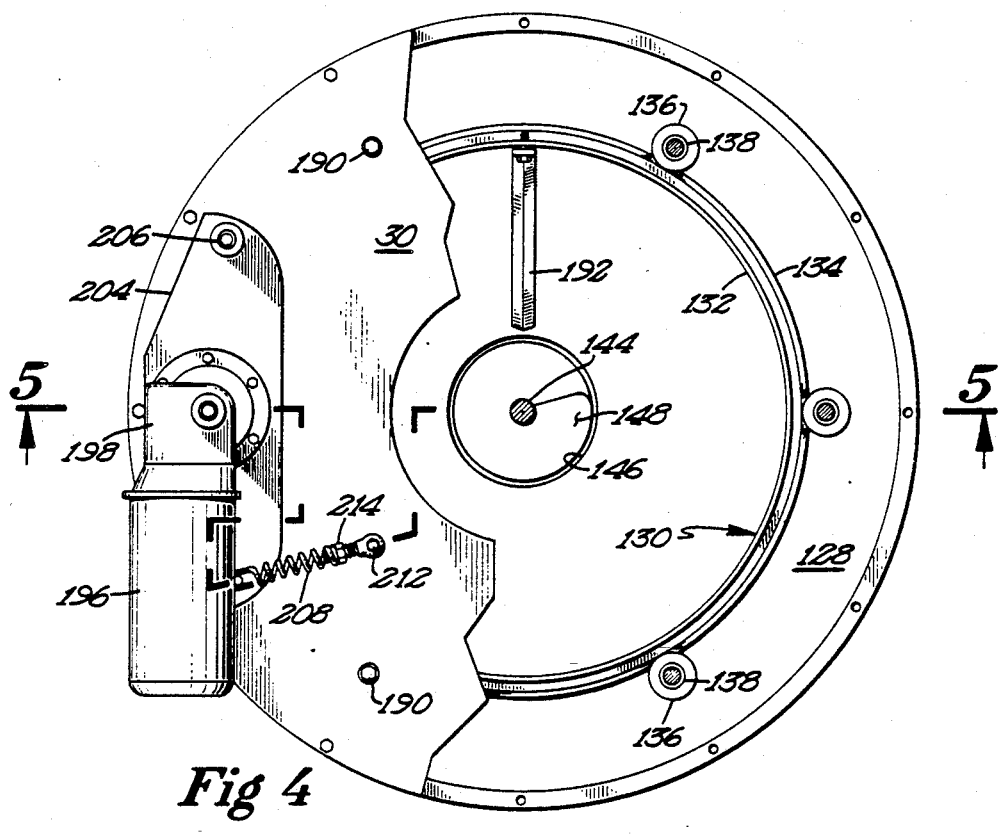
Fig 4
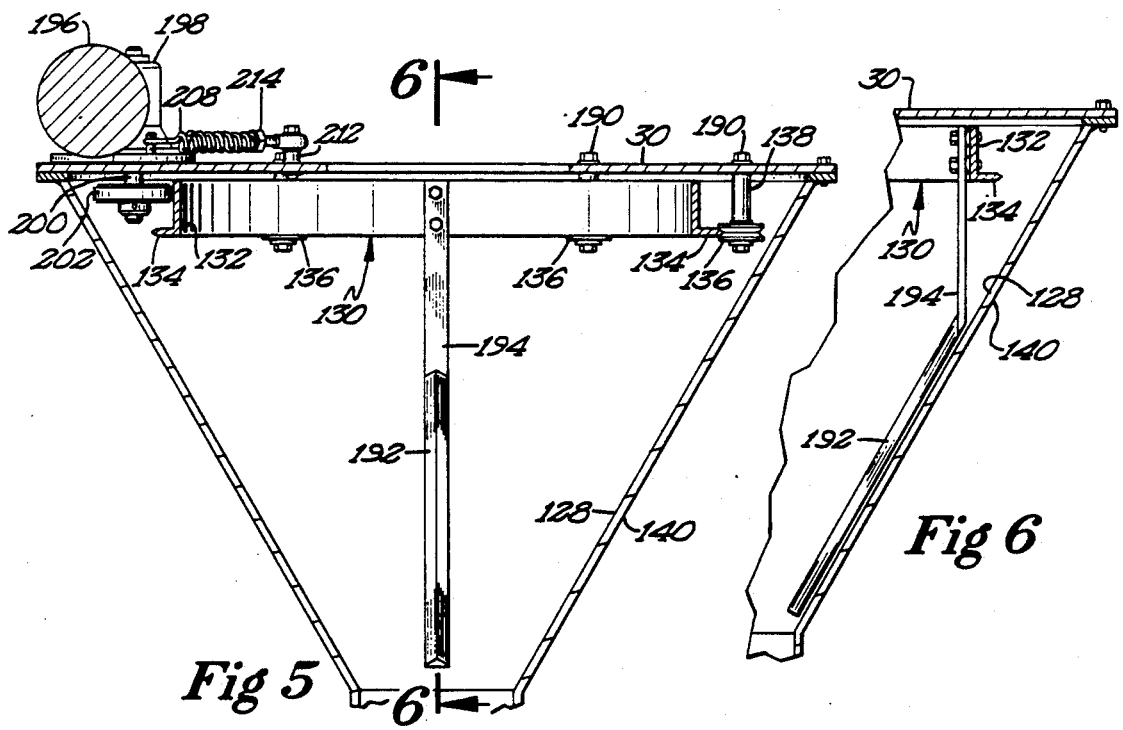
Fig 5
Fig 6

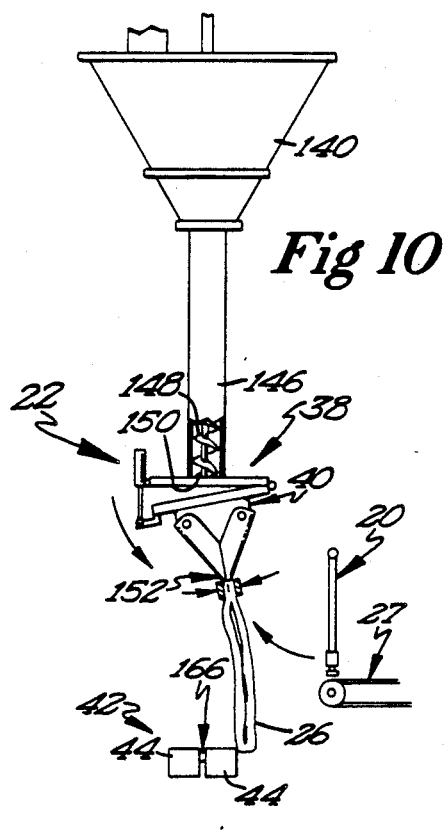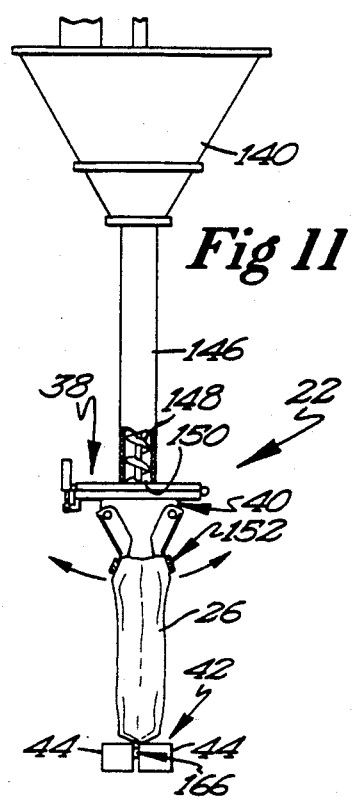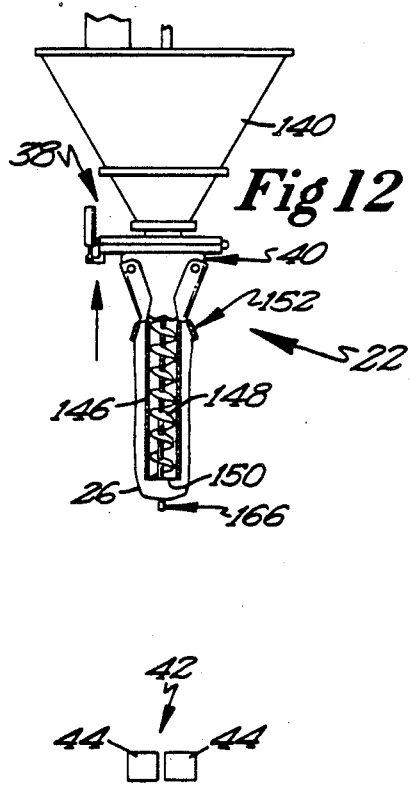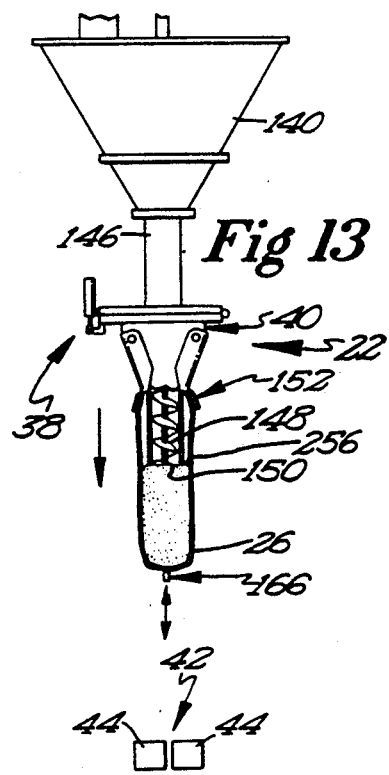

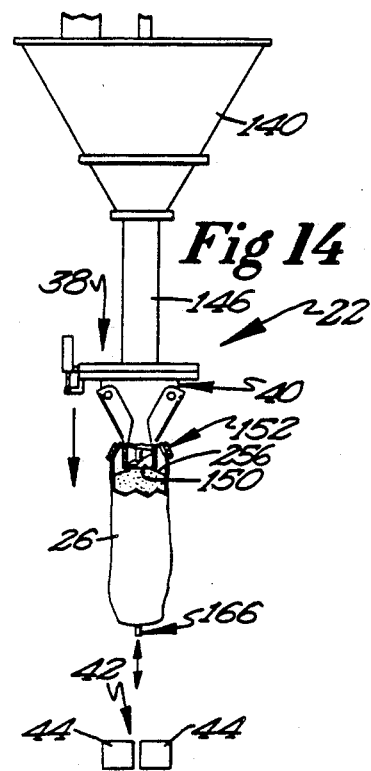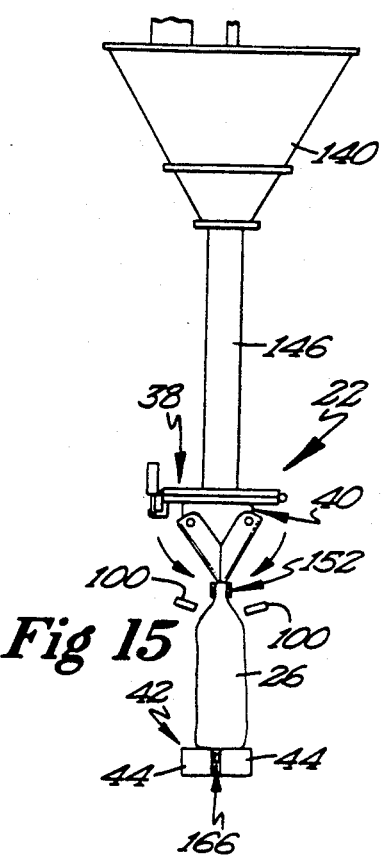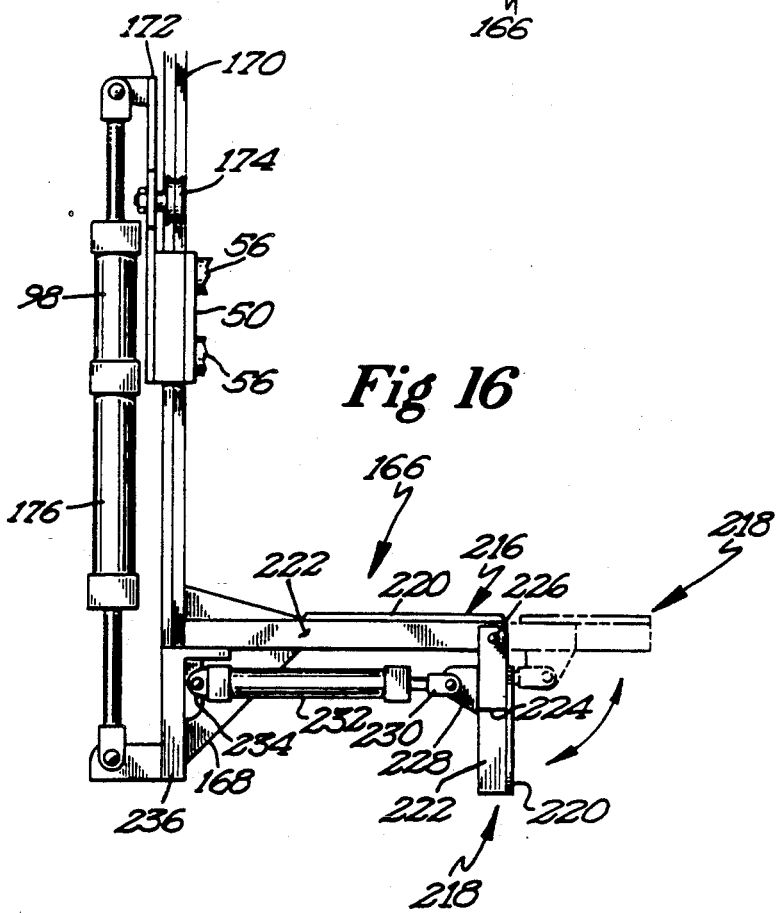

5,109,894

VERTICAL BOTTOM-FILL AUGER ASSEMBLY

This is a divisional of copending application Ser. No. 07/559,629 filed on Jul. 30, 1990, now U.S. Pat. No. 5,042,539, which is a continuation-in-part of the co-pending U.S. patent application Ser. No. 07/270,845, which was filed on Nov. 14, 1988 now U.S. Pat. No. 4,944,334. The disclosure, references, and comments contained in that application are fully incorporated herein by reference and made a part of this specification.

BACKGROUND OF THE INVENTION

This invention relates generally to a mechanism for de-aerating and dispensing a finely powdered product into bags, and particularly to a vertical bottom-fill auger assembly having an internal, rotating agitator or wiper, and a vertical bag handling carriage or mechanism including a traveling bag settler.

Various rotary feed auger systems for dispensing particulate matter into containers are known, as well as their respective disadvantages and shortcomings, as were discussed in the previously referenced co-pending application.

BRIEF SUMMARY OF THE INVENTION

It is one object of this invention to design an vertical bottom-fill auger assembly for dispensing finely powdered or particulate matter from a fill spout, and for that auger assembly to maximize the compression and de-aeration of the product in order to create a very uniform product density at the dispensing spout.

It is an additional object of this invention to design the assembly in combination with a vertically moving bag handling mechanism which provides for maximum settling and de-aeration of the product even during high speed bulk filling.

Briefly described, the vertical bottom-fill auger assembly of this invention includes a bottom-fill auger bowl containing an internal rotating agitator or wiper element, and a vertical moving carriage or bag handling mechanism including a traveling bag settler. The vertical movement of the carriage or bag handling mechanism may be adjusted in response to the vertical auger revolution rate, the product density or weight as measured by a bulk or net weigh scale attached to the bag support assembly, or to comport to a premeasured charge that is bulk loaded into the auger bowl. The agitator or wiper may be of a configuration having a blade mounted on a rotating shaft vertically disposed in the center of the auger bowl, or may be carried on a rotating ring horizontally disposed at or near the top of the auger bowl. The traveling bag settler includes an arm which may be oscillated in a vertical plane to strike the bottom of a bag being filled, and which travels with the bag as it descends during filling and when lowered to a conveyor. The conveyor is split to form two spaced-apart tracks with the arm of the bag settler being received between the tracks when the bag and bag settler are lowered.

BRIEF DESCRIPTION OF THE DRAWINGS

FIG. 4 is a partially broken away top view of the bottom-fill auger bowl and rotating ring mounted agitator;

FIG. 5 is a cross section view of the bottom-fill auger bowl and rotating ring mounted agitator of FIG. 4 taken through line 5—5 of FIG. 4;

FIG. 6 is a cross section view of the rotating ring mounted agitator and bottom-fill auger bowl of FIG. 4 taken through line 6—6 of FIG. 5;

FIG. 10 is a side elevation view diagrammatically showing a first stage in which a bag from the bag magazine is hung by the bag hanging mechanism on the tilted spout;

FIG. 11 is a side elevation view diagrammatically showing a second stage in which the spout and top of the bag are opened;

FIG. 12 is a partially broken away side elevation view diagrammatically showing a third stage in which the auger tube is received within the bag near the bottom thereof and filling of the bag is to start;

FIG. 13 is a partially broken away side elevation view diagrammatically showing a fourth stage in which the auger tube is received within the bag near the center thereof and filling of the bag is partially completed;

FIG. 14 is a partially broken away side elevation view diagrammatically showing a fifth stage in which the auger tube is received within the bag near the top thereof and filling of the bag is completed;

FIG. 15 is a partially broken away side elevation view diagrammatically showing a sixth stage in which the auger tube is removed from the bag and the top of the bag is being clamped, with the bag resting on and transferred to the conveyor assembly; and FIG. 16 is a side elevation view showing the breakaway embodiment of the travelling bag settling arm.

DESCRIPTION OF THE PREFERRED EMBODIMENTS

The vertical bottom-fill auger assembly of this invention is shown in FIGS. 1-16 and referenced generally therein by the numeral 10.

Figure 1:
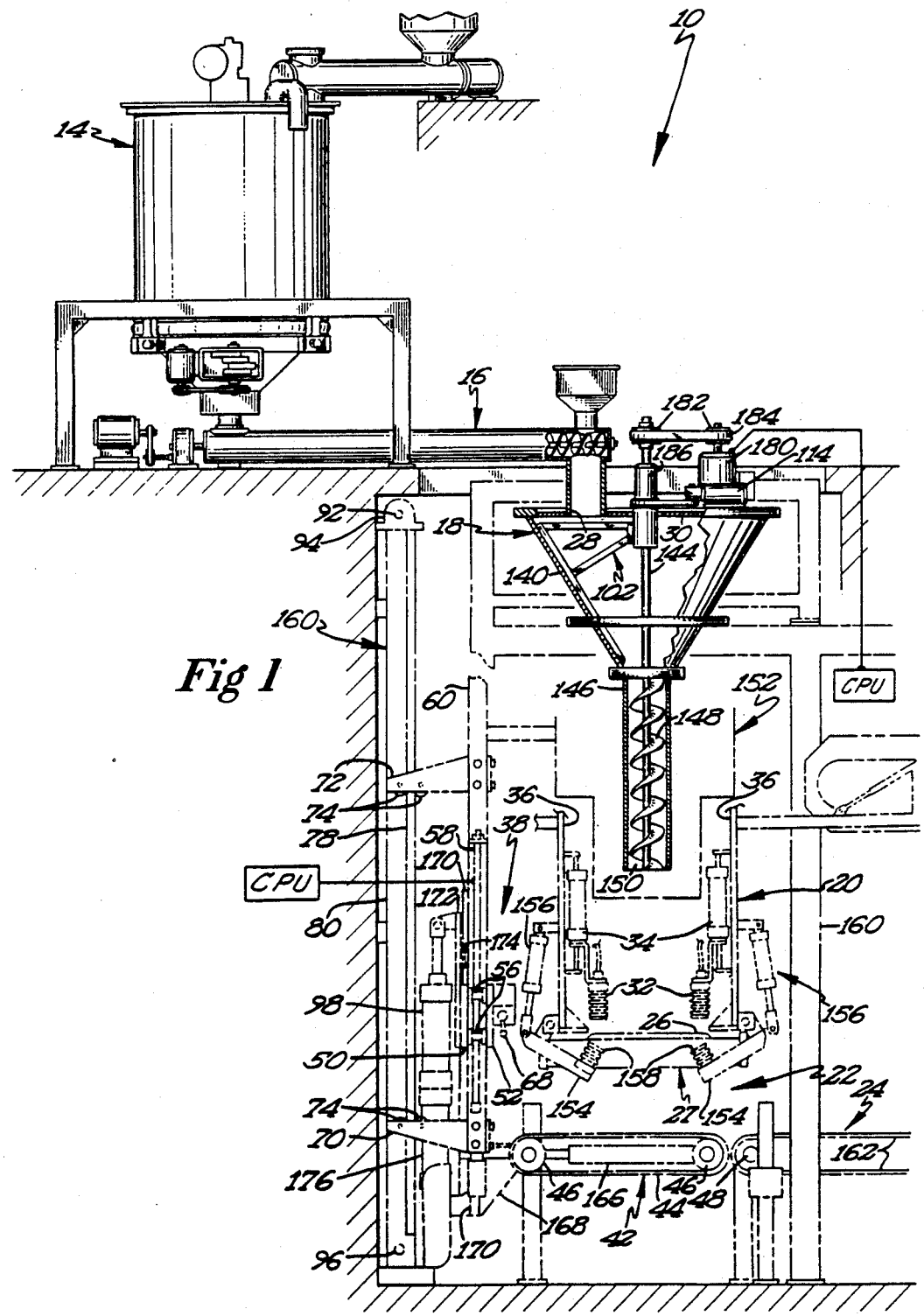
FIG. 1 is a partial section front elevation view of the vertical bottom-fill auger of this invention in combination with a vibrating hopper and cross auger assembly.
Figure 7:
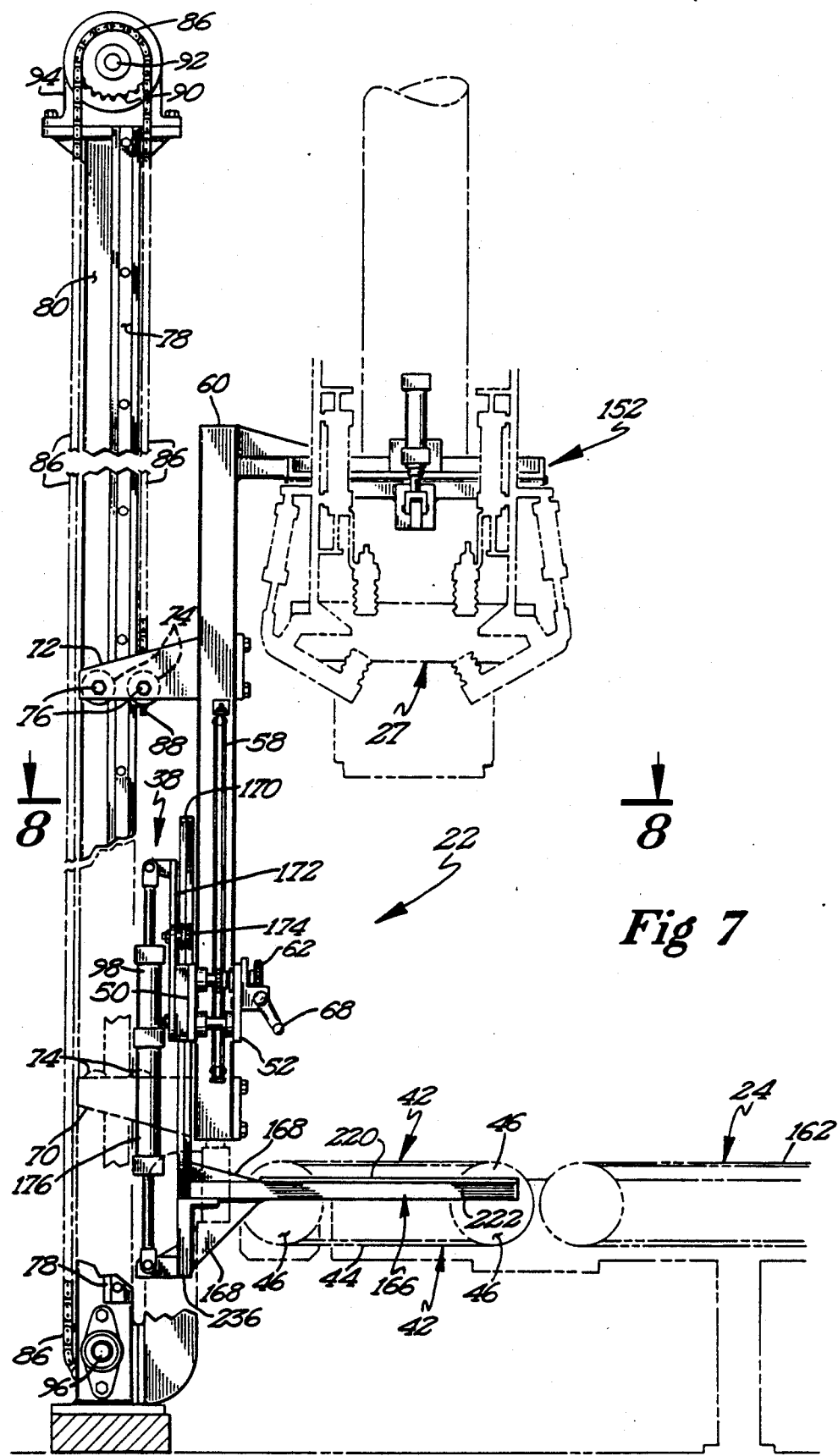
FIG. 7 is a side elevation view of the carriage and travelling bag tamping arm of the vertical bottom-fill auger assembly with the conveyor assembly, bag handling mechanism, and bag filling assembly shown in phantom.

Referring to FIG. 1, the bottom-fill auger assembly 10 is shown connected to a vibrating hopper assembly 14 and cross-auger conveyor assembly 16 previously described in the above referenced co-pending application Referring to FIGS. 1 and 7, it may be seen that the vertical bottom-fill auger assembly 10 may be divided into several related sub-assemblies: a vertical bottom-fill auger 18, a bag pickup and hanging mechanism 20, a vertical bag handling assembly 22, and a bag conveyor system 24 for transporting the filled bags 26 to subsequent sealing and loading stations (not shown).

Referring to FIGS. 1 and 7-9, the bottom-fill auger 18 includes an auger hopper 140 into which product is transferred through an open port 28 in the lid 30 thereof.

The vertical bottom-fill auger assembly 18 includes a generally vertical auger shaft 144 which extends downwardly through the open bottom of the auger hopper 140 and is received within the depending fill tube 146. The section of flighting 148 connected to the auger shaft 144 preferably extends substantially through the complete length of the fill tube 146 to the bottom end of the fill tube 146, and in some cases extends upwardly above the top of the fill tube 146 and into the interior of the auger hopper 140. The flighting 148 conveys product from the auger hopper 140 through the fill tube 146 to the terminal spout or dispensing neck 150, which is attached to or otherwise defined by the bottom or distal end of the fill tube 146. The flighting compresses and de-aerates the product and maintains a generally uniform density of product as it is delivered or dispensed from the dispensing neck 150 into the bag 26.

In operation, a plurality of bags 26 are stored in a bag magazine (not shown) or are delivered via a bag input conveyor 27 having a terminal delivery end disposed in position adjacent to the bag handling station 20 such that an individual bag 26 may be selectively and automatically grasped by the bag pickup and hanging mechanism 20. The bag pickup and hanging mechanism 20 has a pair of pivoting arms 154 controlled by double acting power cylinders 156 and bag holding members 158, and a second set of bar holding members 32 carried on a second set of double acting power cylinders 34. The bag holding members 32, 158 work in combination to grip the gusset of the bag 26 to be filled, and position that bag 26 on the fill spout 40 of the depending fill tube 146. The bag pickup and hanging mechanism 20 is preferably mounted on a pair of pivoting vertical arms 36 for lateral and vertical movement between a first or extended position adjacent to the filling spout 40 such that the bag 26 is suspended from the bag pickup and hanging mechanism 20 and generally below the terminal end 150 of the depending fill tube 146, and gripped such that an operative portion of the filling spout 40 and at least a portion of the fill tube 146 may be slidably received within the bag 26 to mount or hang the bag 26 on the fill tube 146 and filling spout 40, and a second or retracted position displaced from the extended position and more closely adjacent to the bag input conveyor 27.

Referring to FIGS. 1, 7, and 10-15, it may be seen that the fill tube 146 may include a clam-jaw fill spout 40 of a type known to the art which is received within the open neck or gusset of the bag 26. The vertical bag handling assembly 22 includes a bag gripping means 152 capable of supporting the bag 26 on the filling spout 40 as it is being filled with product, and clamping the open top or gusset of the bag 26 against the opposing sides of the filling spout 40 to form a seal with the filling spout 40 which prevents the product from becoming airborne or otherwise escaping during filling. The bag gripping means 152 may be any type known to the art, such as those disclosed in U.S. Pat. Nos. 4,432,186 or 4,612,965, and particularly in U.S. Pat. No. 4,322,932. The bag gripping means 152 moves in a vertical path with the filling spout 40 and bag 26, and may be mounted to and carried on either the filling spout 40 or the vertical bag handling assembly 22, as described further below.

In some applications, it may be preferred that the fill spout 40 be pivotably mounted and carried on the fill tube 146 such that it may pivot between a generally vertical orientation aligned with and disposed beneath the fill tube 146 for filling, and a angled position whereby the distal end is disposed closer to the bag magazine or terminal delivery end of the bag input conveyor. In this manner, the fill spout 40 may be pivoted toward the bag magazine or terminal delivery end of the bag input conveyor so that a bag 26 may be applied to and mounted on the fill spout as readily as possible once the previous filled bag 26 has been removed, as shown in FIG. 10. This is important where the vertical bottom-fill auger assembly 10 is capable of propelling all or substantially all of the product into the bag 26 in a short period, and the time necessary to remove and rehang the bags 26 becomes a limiting factor in the cycling rate for the entire bottom-fill auger assembly 10.

The filling spout 40 and bag gripping mechanism 152 are both mounted on a bag elevator assembly 38, which may be considered as a component of the vertical bag handling assembly 22. The bag gripping mechanism 152 and fill spout 40 are movable along a vertical path on the tracks 36 relative to a stationary frame 160 so that the bag 26 may be raised to a filling position whereat the fill tube 146 is received through the fill spout 40 and open top or gusset of the bag 26, and the terminal end 150 of the fill tube 146 is disposed substantially within the interior of the bag 26 and positioned near or closely confronting the closed bottom of the bag 26. The bag elevator assembly 38 may be controllably lowered to a filled position whereat the terminal end 150 of the fill tube 146 is positioned near or closely adjacent to the open top or gusset of the bag 26 as the bag 26 suspended from the bag gripping mechanism 152 and fill spout 40 is filled with product. The filled bag is subsequently lowered by the bag elevator assembly 38 until the bag contacts and rests upon a conveyor belt 162 disposed beneath the vertical bottom-fill auger assembly 18.

Figure 8:
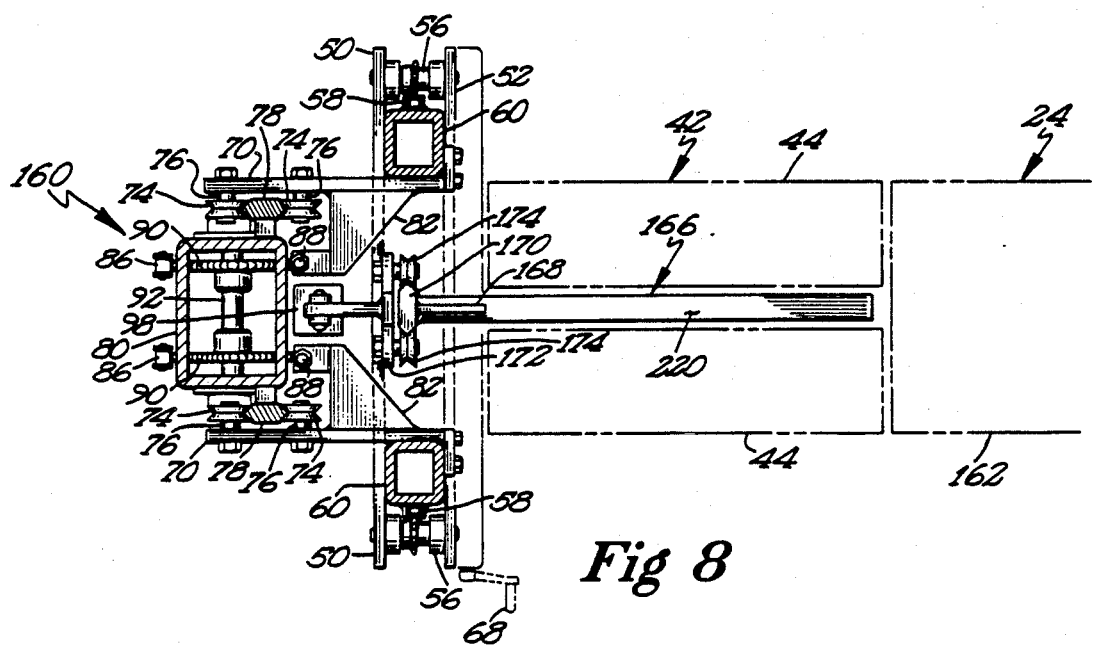
FIG. 8 is a top cross section view of the carriage and travelling bag tamping arm of FIG. 7 taken through line 8—8 of FIG. 7 with the conveyor assembly shown in phantom.

Referring to FIGS. 7 and 8, the conveyor belt assembly 24 preferably includes a bag receiving segment 42 having a pair of spaced-apart tracks 44 which are each carried on at least a pair of conveyor wheels 46, the tracks 44 being spaced apart in the area directly beneath the vertical path of the bag 26 as it is carried on the bag elevator assembly 40. One of the pair of conveyor wheels 46 and the spaced-apart tracks 44 may be driven by a separate motor (not shown), or linked to the mechanism which drives the drums 48 and main conveyor belt 162 of the conveyor belt assembly 24.

A traveling bag settling arm 166 or tamping arm is initially disposed between the tracks 44 of the bag receiving segment 42 of the conveyor belt assembly 24, and at or slightly beneath the level of the top surface of each of the tracks 44, as shown in FIGS. 1 and 7, when the bag elevator assembly 40 is in the lowered position.

Figure 9:
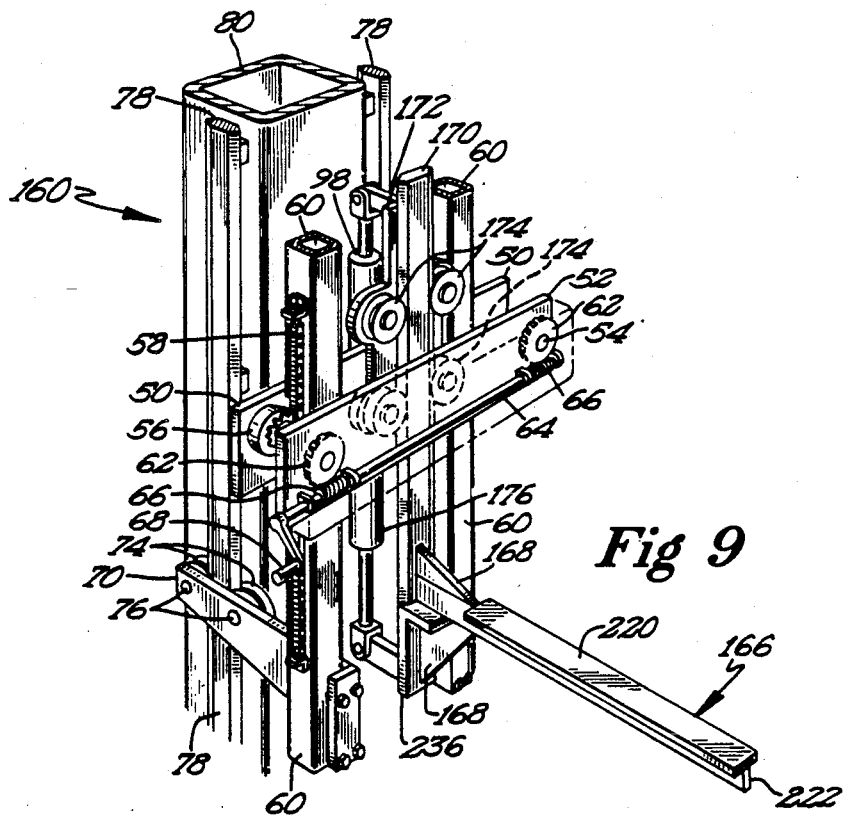
FIG. 9 is a front perspective view of the carriage and travelling bag tamping arm of FIG. 7.

Referring to FIGS. 7-9, the bag settling arm 166 is connected to a bracket 168 and in turn to an upright carriage plate 170 which is mounted for vertical movement along a track 172. The track 172 includes at least two pair of spaced-apart and forwardly extending grooved wheels 174 which engage the beveled outer side edges of the upright carriage plate 170 and carry the upright carriage plate 170 in a vertical path.

The upright carriage plate 170 is raised and lowered relative to the track 172 by a first double acting power cylinder 176 connected at its lower end to the bracket 168 and capable of generating a reciprocating movement to rapidly raise and lower the bag settling arm 166. The top end of the double acting power cylinder 176 is connected to a second dual acting power cylinder 98.

Referring particularly to FIGS. 7-9, it may be seen that the track 172, upright carriage plate 170, and bag settling arm 166 are also mounted for generally vertical movement relative to the upright frame 160 while simultaneously being oscillated by the dual acting power cylinder 176.

The track 172 is fixedly connected to the front side of a first cross member 50. The first cross member 50 is spaced-apart from a second cross member 52 oriented parallel with the first cross member 50 and disposed in front of the first cross member 50. The first cross member 50 and second cross member 52 are interconnected by at least a pair of axles 54. A bushing and gear assembly 56 is fixedly mounted on each of the axles 54, each bushing and gear assembly 56 operatively meshing with one of a pair of geared guide chains 58 or tracks which are each stationarily mounted on the outer side of one of a pair of upright standards 60. The upright standards 60 are disposed between the first cross member 50 and second cross member 52, and between the pair of axles 54 and bushing and gear assemblies 56. Each axle 54 extends through an aperture in the second cross member 52 and a spur or helical gear 62 is fixedly mounted on the forward end of each axle 54 on the front side of the second cross member 52. A rod 64 rotatably mounted to the front side of the second cross member 52 extends between the two spur or helical gears 62, and a pair of worm gears 66 are connected to or defined by the rod 64 and positioned so as to mesh with each of the two spur or helical gears 62. A handle 68 connected to one end of the rod 64 permits manual rotation of the rod 64 relative to the second cross member 52. Rotation of the rod 64 in a selected direction will rotate the worm gears 66 and the spur or helical gears 62, thereby rotating the axles 54 and bushing and gear assemblies 56. This rotation will cause the first cross member 50 and second cross member 52 to be carried upwardly or downwardly on the geared guide chains 58 relative to the upright standards 60, depending upon the direction of rotation of the handle 68 and rod 64.

A pair of brackets 70, 72 are connected to each of the upright standards 60, one bracket 70, 72 being positioned more closely proximate to the upper end of each upright standard 60 while the remaining bracket 72, 70 is positioned more closely proximate to the lower end of each upright standard 60. Each bracket 70, 72 extends rearwardly from the corresponding upright standard 60, and includes a pair of spaced-apart grooved guide wheels 74 rotatably mounted on axles 76 connected to and extending inwardly from the inside surface of each of the brackets 70, 72. The guide wheels 74 engage and ride on the beveled edges of one of a pair of guide rails 78 which are fixedly attached to and set off a short distance from the opposing sides of an upright column 80 of the stationary frame 160.

Extending inwardly from the inside surface of each of the brackets 70, 72 is a generally horizontal plate 82, as may be seen particularly in FIGS. 7 and 8. Each plate 82 has a rearwardly extending flange 84 to which one end of a gear chain 86 is attached using a threaded fastener 88 which is received through an aperture in the flange 84 and permits adjustment of the tension on the gear chain 86. Each of the two gear chains 86 extends from the plate 82 connected to the upper bracket 72 in an upward direction along the upright column 80, and rearwardly over one of a first pair of spur gears 90 fixedly mounted on an axle 92 which is rotatably mounted on a gear support 94 at the top of the upright column 80. Each gear chain 86 then extends down the rear side of the upright column 80 and forwardly under a one of a second pair of spur gears (not shown) fixedly mounted on an axle 96 which is rotatably mounted at the bottom of the upright column 80. Each gear chain 86 then extends upwardly to the plate 82 connected to the lower bracket 72 and is fastened to the underside thereof using a threaded fastener 88.

Consequently, the components of the vertical bag handling assembly 22 may be raised and lowered relative to the stationary frame 160 and filling tube 146 by rotation of the spur gears 88 and gear chains 86 using a conventional drive motor and differential (not shown). Conversely, the components of the vertical bag handling assembly 22 may be raised and lowered by a dual acting power cylinder (not shown) which is fixedly connected to the stationary frame 160 and the upright column 80, with the spur gears 88 and gear chains 86 being utilized to control the rate of ascent or descent, and maintain the components of the vertical bag handling assembly 22 such as the upright column in proper alignment and position.

The filling spout 40 and the bag gripping mechanism 152 are both mounted on the bag elevator assembly 38, and may be moved in a vertical direction independent of the vertical movement of the bag settling arm 166 by the second dual acting power cylinder 98 which is mounted to and in vertical alignment with the first dual acting power cylinder 176. This second power cylinder 98 permits the bag settling arm 166 to be positioned at a particular height relative to the bottom of a bag 26, which allows for many different sixed bags 26 to be used, and also adds additional distance to the stroke or path that the bag settling arm 166 may traverse when it is oscillating, vibrating, or striking the bottom of the bag 26 in any manner.

With the bag elevator assembly 38 in a lowered position, the spout 40 may be pivoted toward the bag input conveyor 27 at the same time that a bag 26 is picked up from the bag input conveyor 27 and hung on the spout 40 by the bag pickup and hanging mechanism 20, as shown in FIG. 10. The fill spout 40 may then be pivoted so that the bag 26 is aligned with and under the fill spout 40 and fill tube 146, as shown in FIG. 11. The first power cylinder 176 raises the carriage plate 170 to the top filling position, with the bag tamping arm 166 positioned directly beneath the bottom of the unfilled bag 26, and the fill tube 146 positioned near the bottom of the bag 26, as shown in FIG. 12. As the bag 26 is filled with product and simultaneously lowered along with the carriage plate 170 by the first power cylinder 176, the bag tamping arm 166 is also being lowered at the same average rate as the bag 26 but with the bag tamping arm 166 being reciprocally raised and lowered by the second power cylinder 98 to oscillate or vibrate in the vertical direction to repeatedly strike the bottom of the bag 26 and settle the product within the bag 26, as shown in FIGS. 13 and 14. The terminal end 150 of the fill tube 146 remains at the level of the top of the product in the bag 26. The bag tamping arm 166 will precede the bag 26 downwardly until the bag 26 is resting on the top of the tracks 44 of the bag receiving segment 42 of the conveyor belt assembly 24, with the bag tamping arm 166 being disposed between the tracks 44 and beneath the top or upper surface of the tracks 44, as shown in FIG. 15.

The bag tamping arm 166 may also be used to provide a single, more forceful strike to the bottom of the bag 26 to level and redistribute the product once the bag 26 is filled, and even after the bag has been rested on the tracks 44 of the bag receiving segment 42. Top forming arms 100 such as those disclosed in U.S. Pat. No. 4,322,932 will then move inwardly to grip the open top or gusset of the bag 26 from either side, and hold the bag 26 upright as it is removed from the spout 40 and transferred from the tracks 44 of the of the bag receiving segment 42 of the conveyor belt assembly 24 to the conveyor belt 162, and carried to the conventional sealing station (not shown). The spout 40 may again be pivoted toward the bag input conveyor 27 as a second bag 26 is picked up from the bag input conveyor 27 and hung on the spout 40 by the bag pickup and hanging mechanism 20, and the filling and settling cycle will be repeated as described above.

The rate of vertical movement of the bag elevator assembly 38 including the upright column 80, and thereby the rate at which the bag 26, is electronically linked to and controlled by the revolution of the auger shaft 144, from which the quantity of product placed in the bag 26 can be determined. Since the number of revolutions of the auger shaft 144 in any given period and the weight of the product entering the bag 26 during that same period can be monitored or measured directly, it is possible to calculate with considerable accuracy the relationship between product weight or volume (given relatively constant density in the fill tube 146) which is delivered to the bag 26 per revolution of the auger shaft 144. Different types of bags 26 will tend to fill at slightly different rates, and the shape of the bottom of the bag 26 will control the speed at which the top of the product rises relative to the bottom of the bag 26 as the product enters the bag, approaching a linear relationship as more of the bag 26 is filled for relatively straight-sided bags 26. It is possible to chart the fill characteristics for a particular type of bag 26 t form a mathematical relationship between volume of product filled and the height of the product level within the bag 26, and match the speed or distance which the bag 26 is lowered to maintain the terminal spout or dispensing neck 150 of the fill tube 146 at the very top surface of the product in the bag 26. This permits a minimal amount of product to become airborne or re-aerated even at high bulk fill rates, and may include specific compensations for the movement and striking action of the bag settling arm 166.

Similarly, due to the substantially uniform density of the product within the auger hopper 140 and fill tube 146, the weight of product filled into the bag 26 at any particular time during the selected interval in which the bag 26 is filled will be related to the number of revolutions of the auger shaft 144 occurring prior to that particular time, with the actual weight of product within the bag varying from an estimated weight based on the total number of revolutions of the auger shaft 144 by the weight of the product in-flight between the dispensing neck 150 and the top of the product level within the bag 26.

It is possible to utilize these relationships in various ways in order to maximize the filling accuracy of the apparatus 10 when filling the bag 26 with a target weight of product, or in minimizing the amount of airborne or re-aerated product and the in-flight weight error by maintaining the dispensing neck 150 at the bottom end of the fill tube 146 as closely proximate to the product level within the bag 26 as possible.

For example, using conventional means (such as a net weigh scale carried on the bag elevator assembly 38) for determining an approximate weight of the product which has been filled into the bag 26 at a particular time concurrent with or prior to a selected interval during which that approximate weight of product is being filled into the bag, and conventional means (such as a one unit per revolution pickoff) for counting the number of revolutions of the auger shaft 144 occurring during that interval prior to the particular time, a CPU can then calculate an approximate flow density of the product within the fill tube 146 (the approximate flow density being expressible in units of weight of the product per auger revolution) and a weight difference between the target weight and the approximate weight of the product which has been filled into the bag 26 at the particular time. In response to this comparison, the rate of revolution of the auger shaft 144 may be adjusted, and a specific number of revolutions of the auger shaft 144 necessary to fill the weight difference of the product into the bag 26 can be determined with the auger shaft 144 then being rotated that number of revolutions to fill the weight difference of the product into the bag 26 such that the bag 26 contains the target weight of the product.

Alternately, the CPU can compare the number of revolutions of the auger shaft 144 prior to the particular time with a predetermined mathematic function or experimentally obtained chart points which relate the number of revolutions of the auger shaft to the expected weight of product filled, or the expected or estimated product level within the bag 26. By comparing the weight difference between the approximate weight of the product measured within the bag 26 and the estimated or expected weight of product which was dispensed from the fill tube 146 given the number of revolution of the auger shaft 144 and the product flow density, a weight of the in-flight product between the bottom end 150 of the fill tube 146 and the product level within the bag 256 may be calculated. Based upon comparison of the target weight with either the sum of the approximate weight plus the in-flight weight, or directly with the estimated or expected weight, the number of revolutions of the auger shaft 144 necessary to reach the target weight can be calculated, and the auger shaft 144 responsively rotated that number of revolutions. Again, the rate at which the bag elevator assembly 38 lowers the bag 26 may be adjusted correspondingly to ensure that the bottom end of the fill tube 146 remains closely proximate to the product level within the bag 26 during the filling cycle.

It may be understood that various adaptations of the general principles and practices described above may be employed where appropriate, depending upon the degree of accuracy necessary, and particularly depending upon the number of data points taken during a selected interval and the number of recalculations or adjustments which are made during that interval. Ideally, however, the limits of the net weight scale, pickoff, load cells, or other conventional measuring instruments will be such that readings may be taken continuously and fed to the CPU, which will in turn integrate the calculations over the entire interval during which the bag 26 is being filled, and produce minimal variance from a smooth curve for each particular time in the selected interval to which data points correspond.

Referring again to FIG. 1, the auger shaft 144 is powered by a drive motor 180 such as a DC electric motor which is coupled to the drive shaft 144 through a pair of pulley wheels 182 and a drive belt 184, with a stabilizer mounting 186 on the top of the auger hopper 140 maintaining the auger shaft 144 in a generally vertical position and preventing misalignment or lateral movement of the auger shaft 144. The stabilizer mounting 186 may include any conventional bushing assembly and may optionally utilize a differential mechanism in some applications.

Because the proper linear alignment and tight fit of the section of flighting 148 or auger blades within the fill tube 146 is important to the operation of the vertical bottom-fill auger assembly 10, the inner surfaces of the fill tube 146 or the outer peripheral edges of the section of flighting 148 may be coated or lined with a layer of ultra high molecular weight high density polyethylene (UHMW HDPE) or a similar suitable covering.

For optimal performance, the product is filled from the vertical bottom-fill auger assembly 18 into the bag by weight, with a first quantity of product being filled in a bulk fill mode and a second quantity of product being filled in a topping or dribble fill mode. The product may be net weighed in the bag as it is suspended on the vertical bottom-fill auger assembly 18, with the scale (not shown) being capable of weighing either the bag 26 and product alone, or the bag 26 and product along with clam-jaw spout 40 and bag gripping mechanism 152. By monitoring the number of revolutions of the auger shaft 144 over the filling period and measuring the weight of the product delivered in the bulk filling mode, an anticipated or in-flight weight of the product between the terminal end 150 of the fill tube 146 may be calculated. This in-flight weight is equal to the ratio over time of the mass of product delivered per revolution of the auger shaft 144 times the number of revolutions of the auger shaft 144. As such, the number of revolutions or partial revolutions of the auger shaft 144 necessary to complete the topping process may be calculated by subtracting the bulk fill weight (the total weight of product delivered during the bulk fill mode which equals the actual weight of product in the bag 26 compensated by accounting for or adding the anticipated weight of the falling product) from the desired target weight, and dividing that quantity of product by the ratio of weight to revolutions of the auger shaft 144. Because the density of the product may be maintained within very uniform parameters, the bulk filling for many products may be accomplished to within a few ounces or less without weighing during the bulk fill mode, and activating the scale only during the topping process. This process will also allow compensation for deviations in the net weight measured caused by acceleration of the scale as the spout 40 and bag 26 are raised or lowered by the bag elevator assembly 38.

The bag, bag gripping mechanism 152, and bag elevator assembly 38 may be electrically timed or mechanically interconnected with the auger shaft 144 and programmed to move downwardly in synchronized relation to the number of revolutions of the auger shaft 144, such that as product is filled into the bag 26 during the bulk fill mode, after the initial revolutions of the auger shaft 144 the bag 26 will be lowered at a relatively uniform rate so that the distance between the top of the product in the bag 26 and the terminal end 150 of the fill tube 146 will be kept at a minimum, thereby also minimizing the amount of in-flight product and increasing the accuracy of both the bulk filling process and the product in-flight calculation, with the terminal end 150 of the filling tube 146 traversing the distance from the bottom of the bag 26 to the top of the bag 26 during one fill cycle. This may be accomplished using conventional sensors to produce signals corresponding to existing or preselected conditions, and a control means such as a microprocessor or other logic circuit to interpret those signals and responsively regulate the movement of the bag elevator assembly 38 and bag settling arm 166, with the sensors and control means monitoring such conditions as the rate of revolutions of the auger shaft 144, the displacement of the bag elevator assembly 38 relative to the stationary frame 160, and the positions of the bag gripping mechanism 152 and bag settling arm 166 relative to the upright column 80, using sensors of a type known to the art and producing electronic signals corresponding to predetermined values or conditions. Similarly, an operator may pre-program the distance the bag 26 is initially lifted when being positioned relative to the terminal end 150 of the fill tube 146 to accommodate different sizes and types of bags 26, as well as adjusting the timing or displacement of other components of the entire vertical bottom-fill auger assembly 10.

Referring particularly to FIGS. 1-6, it may be seen that in order to insure that the product in the auger hopper 140 is de-aerated and maintained at a uniform density, and to ensure that all of the product within the auger hopper 140 is emptied during a bulk fill process, the auger hopper 140 is equipped with an agitator or wiper assembly 102.

For purposes of clarification, the term agitator refers more particularly herein to a device for mixing or stirring the product and breaking up product clumps by passing through the product itself at or a distance displaced from the surface 128 of the auger hopper 140, while a wiper refers to a device that sweeps the surface 128 of the auger hopper 140 and ensures that product does not cling to that surface 128. As such, it should be understood that the wiper device may be particularly adapted or suited for use in a vertical bottom-fill bag filling machine 10 having no vertical auger shaft 144, but merely where a pre-weighed or pre-measured charge of product is placed in the auger hopper 140 and deposited into a bag 26 through a hollow vertical fill tube 146 or other type of spout.

Figure 2:
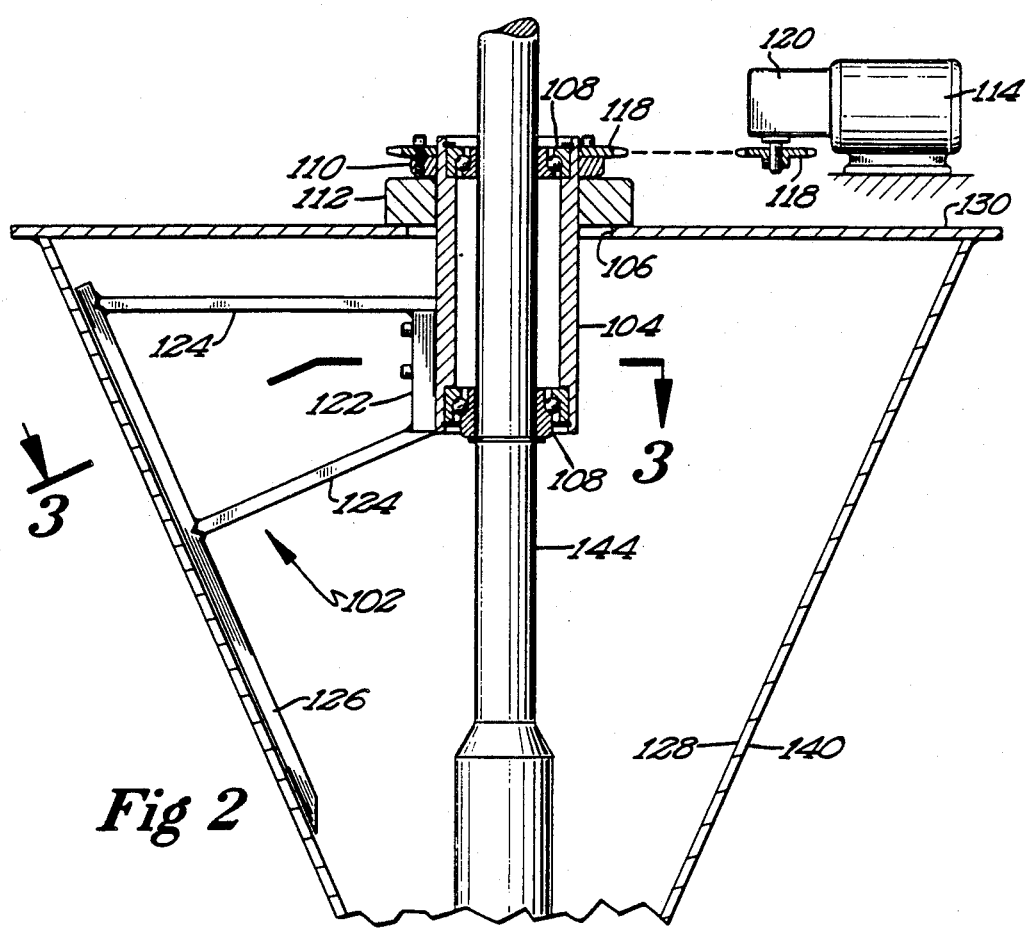
FIG. 2 is a partial cross section side elevation view of the bottom-fill auger bowl taken through line 2—2 of FIG. 1 showing the center shaft mounted agitator.
Figure 3:
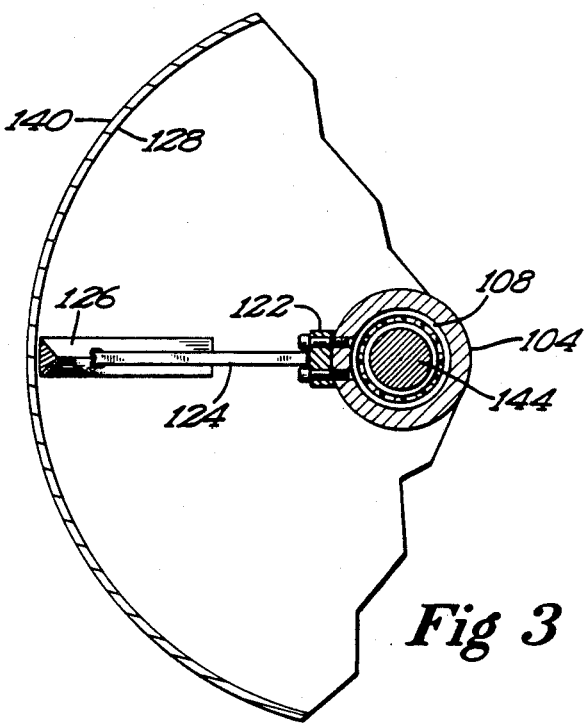
FIG. 3 is a top section view of the bottom-fill auger bowl and center shaft mounted agitator of FIG. 2 taken through line 3—3 of FIG. 2.

The shaft-mounted embodiment of the agitator or wiper assembly 102 is shown particularly in FIGS. 1-3. The shaft-mounted embodiment of the agitator or wiper assembly 102 includes a center collar 104 which surrounds or circumscribes the auger shaft 144 and extends a short distance upwardly above the lid 30 of the auger hopper 140 through a center aperture 106 in the auger hopper 140, and downwardly a greater distance into the interior of the auger hopper 140. The center collar 104 is carried on and maintained in radial alignment with the auger shaft 144 by a pair of bearing assemblies 108, and the center collar 104 may thereby rotate independently of the auger shaft 144 on those bearing assemblies 108. The center collar 104 is supported by a retaining ring 110 fixedly attached to the top end of the center collar 104 and having an outer diameter greater than the inner diameter of a retaining collar 112 fixedly connected to the lid 30 of the auger hopper 140 beneath the retaining ring 110. The retaining ring 110 may rest and slidably rotate directly on the retaining collar 112, or the top of the retaining collar 112 and bottom of the retaining ring 110 may be equipped with a friction-reducing surface or a bearing assembly (not shown) to permit free rotation of the center collar 104. The center collar 104 is driven by a drive motor 114 or similar drive mechanism with the drive motor 114 being operatively connected to the center collar 104 by any conventional type of a drive chain assembly 116 including such components as friction drive wheels or spur gears 118 and a differential 120.

Extending from and fixedly mounted on the center collar 104 beneath the lid 30 and on the interior of the auger hopper 140 are a bracket 122 and pair of braces 124 extending radially outward from the bracket 122 and center collar 104, with a blade 126 being fixedly connected to the ends of the braces 124. The blade 126 is aligned generally parallel with and disposed in close proximity to the inner surface 128 of the generally conical auger hopper 140 and spaced apart therefrom a distance on the order of twelve inches or less in te case of an agitator, or extremely close proximity or contacting the inner surface 128 in the case of a wiper. The blade 126 and braces 124 should be constructed from a material similar to the inner surface 128 of the auger hopper 140 which is suitable for use in contact with the product, and the blade 126 and braces 124 should be shaped so as to prevent the buildup or retention of product in corners or crevices. In some instances, the blade 126 may preferably contact the inner surface 128 of the auger bowl 140, although the outer edge of the wiper blade 126 should then be covered or lined with a friction-reducing protective material such as ultra high molecular weight high density polyethylene (UHMW HDPE) or a similar suitable material to prevent scoring of the inner surface 128 of the auger hopper 140.

The rotating ring embodiment of the agitator or wiper assembly 102 is shown particularly in FIGS. 4-6. The agitator or wiper assembly 102 includes a cylindrical ring 130 or drum having a generally upright side wall 132 and an outwardly extending or projecting rim 134 or lip which is fixedly connected to the lower edge of the cylindrical ring 130. The outer peripheral edge of the rim 134 defines a beveled edge which is received within a plurality of spaced-apart grooved guide wheels 136 suspended from the lid 30 of the auger hopper 140 and rotatably mounted on axles 138. The axles extend through apertures in the lid 30 and are secured thereto using threaded fasteners 190. The axles 138 and guide wheels 136 are positioned approximately equidistantly around the periphery of the cylindrical ring 130 to support the cylindrical ring 130 in a horizontal position as the cylindrical ring 130 rotates on the guide wheels 136. A blade 192 is fixedly attached to a strut 194 which is attached to and extends downwardly from the inner surface of the upright wall 132 of the cylindrical ring 130, the blade 192 being disposed proximate to and generally parallel with the angled side wall of the auger hopper 140 in the case of an agitator, or extremely close or contacting the inner surface 128 in the case of a wiper.

The cylindrical ring 130 may be selectively rotated in either a clockwise or counter-clockwise direction using a drive motor 196 and differential 198 which are coupled to and rotate an axle 200 and drive wheel 202. The axle 200 and drive wheel 202 extend downwardly into the interior of the auger hopper 140 through an enlarged aperture (not shown), with the drive wheel 202 being fixedly connected to the axle 200 proximate to the lower end thereof. The drive motor 196 and differential 198 are mounted on a support plate 204 which is disposed on the top side of the lid 30, the support plate 204 being mounted such that it may rotate relative to a pivotal axis 206 and the lid 30. A coil spring 208 extending between a pin 210 fixedly attached to and extending upwardly from the support plate 204 and a stanchion 212 fixedly attached to the lid 30 urges the support plate 204, drive motor 196, differential 198, axle 200, and drive wheel 202 to pivot radially inward relative to the axis 206, thereby moving the drive wheel 202 from a disengaged position spaced apart from the upright wall 132 to an engaged position in frictional contact with the upright wall 132, and further maintains the drive wheel 202 in that engaged position. The tension on the spring 208 may be adjusted using an I-bolt disposed between one end of the spring 208 and the stanchion 214 or pin 210. The enlarged aperture therefore has a width at least as great as the diameter of the axle 200, and a generally arcuate shape with a length sufficient to permit movement of the drive wheel 202 between the engaged and disengaged positions.

Referring particularly to FIG. 16, the pivotal kicker embodiment of the bag settling arm 166 is shown. The bag settling arm 166 is divided into a first arm segment 216 and a second or kicker arm segment 218, The kicker arm segment 218 being pivotally mounted to move between a retracted position as shown in FIG. 16 and an extended position as shown in phantom. Each of the first arm segment 216 and kicker arm segment 218 have a top plate 220 which are disposed in a generally horizontal orientation aligned with one another when the kicker arm segment 218 is in the extended position, and which are fixedly attached to and generally perpendicular with the main arm members 222 of the first arm segment 216 and kicker arm segment 218. A pair of bracket plates 224 are fixedly attached to opposing sides of the main arm member 222 of the kicker arm segment 218, and extend rearwardly and overlap opposing sides of the main arm member 222 of the first arm segment 216. The bracket plates 224 define a pair of aligned apertures which receive a pivotal axle 226 which extends through the main arm member 222 of the first arm segment 216, or alternately a pair of pivotal axle pins which extend outwardly from each side of the main arm member 222 of the first arm segment 216. A flange 228 extends from and is fixedly connected to the lower edge of the main arm member 222 of the kicker arm segment 218 generally perpendicular thereto, the flange 228 defining an aperture through which the pin of a conventional mounting yoke 230 of a dual acting power cylinder 232 is received. The power cylinder 232 extends rearwardly and is attached to the upright carriage plate 170 using a conventional mounting yoke 234 disposed beneath the L-shaped support 236 at the lower end of the upright carriage plate 170.

When the power cylinder 232 is extended, the kicker arm segment 218 of the bag settling arm 166 pivots forwardly and upwardly about the axle 226 into generally parallel alignment with the first arm segment 216, and may be pivoted upwardly beyond parallel to some predetermined extent constrained by the clearance between the power cylinder 232 and main arm member 222 of the first arm segment 216. When the power cylinder 232 is retracted, the kicker arm segment 218 pivots downwardly and rearwardly until it is disposed in a generally vertical position beneath the first arm segment 216.

The kicker arm segment 218 of the bag settling arm 166 may be extended during normal operation, and may be retracted for maintenance or removal, or when a shortened bag settling arm 166 is appropriate. The kicker arm segment 218 may also be extended to strike the bottom of the bag 26 during filling, or as the bag 26 is lowered onto the spaced-apart tracks 44 of the bag receiving segment 42 of the conveyor belt assembly 24.

While the preferred embodiment of the above vertical bottom-fill auger assembly 10 has been described in detail above with reference to the attached drawing figures, it is understood that various changes and adaptations may be made in the vertical bottom-fill auger assembly 10 without departing from the spirit and scope of the appended claims.

What is claimed is:

1. A vertical bottom-fill auger assembly for use in de-aerating a product and filling a target weight of said product into a bag, said vertical bottom-fill auger assembly comprising:
    a frame assembly;
    a bottom-fill auger assembly, said bottom-fill auger assembly being connected to and supported by said frame assembly, said bottom-fill auger assembly including an auger hopper having an open bottom and a fill tube depending from and connected to said auger hopper and communicating with said open bottom, said fill tube having a length and a bottom end, said fill tube having a spout assembly connected thereto adjacent said bottom end, said bottom-fill auger assembly further including an auger shaft having a section of flighting, said auger shaft having an axis of rotation oriented in a generally vertical direction, said auger shaft extending downwardly within said auger hopper and being received within said fill tube such that said section of flighting extends substantially through said length of said fill tube and terminating proximate to said bottom end, said section of flighting compressing and de-aerating the product within said fill tube to maintain a generally uniform product density as the product is discharged from said bottom end of said fill tube;
    an auger shaft drive means, said auger shaft drive means being connected to said auger shaft and capable of controllably rotating said auger shaft and said section of flighting in a predetermined direction at a selected rate of revolution about said axis of rotation;
    means for determining an approximate weight of the product which has been filled into the bag at a selected time concurrent with or prior to a selected interval during which said approximate weight of the product is being filled into the bag;
    means for counting a number of revolutions of said auger shaft during said selected interval;
    means for determining an approximate flow density of the product within said fill tube, said approximate flow density being expressible in units of weight of the product per auger revolution;
    means for determining a weight difference constituting the difference between the target weight and said approximate weight of the product which has been filled into the bag at said selected time; and
    means for responsively adjusting said rate of revolution of said auger shaft,
    whereby the approximate weight of the product which has been filled into the bag at the selected time is compared to the target weight, the approximate weight being less than the target weight by the weight difference, and whereby the approximate flow density of the product within the fill tube is determined by comparing the approximate weight to the number of auger revolutions during the selected interval, and whereby a number of auger revolutions necessary to fill the weight difference of the product into the bag is determined, the auger shaft being rotated said number of auger revolutions necessary to fill the weight difference of the product into the bag such that the bag contains the target weight of the product.

2. The vertical bottom-fill auger assembly of claim 1 further comprising:
    a bag handling assembly, said bag handling assembly including a bag gripping mechanism for gripping the bag.

3. The vertical bottom-fill auger assembly of claim 2 wherein the bag gripping mechanism is movable between an extended position whereat the bag is suspended from the bag gripping mechanism and gripped such that at least a portion of the spout assembly and at least a portion of the fill tube may be slidably received within the bag, and a retracted position displaced from said extended position.

4. The vertical bottom-fill auger assembly of claim 2 wherein the bag has an open top and a closed bottom, and further wherein the product filled into the bag during the selected interval defines a product level generally adjacent to the top of the product filled into the bag, said product level increasing as the bag is filled with the product, said vertical bottom-fill auger assembly further comprising:
    a bag elevator assembly, said bag elevator assembly being connected to the bag gripping mechanism and movable along a vertical path relative to the frame assembly such that the bag may be raised to the extended position whereat the fill tube is received through the open top of the bag and the bottom end of the fill tube is proximate to the closed bottom of the bag; and
    means for controllably lowering said bag elevator assembly from the extended position to the retracted position whereat the bottom end of the fill tube is proximate to the open top of the bag as the bag is suspended from the bag gripping mechanism and the bag is filled with product.

5. The vertical bottom-fill auger assembly of claim 4 wherein the bag has a shape and the product level rises at a predetermined rate, the product level being dependent upon the approximate weight of product filled into the bag and the shape of the bag, and further wherein the bag elevator assembly controllably lowers the bag corresponding to said rate such that the bottom end of the fill tube is disposed closely proximately to the product level throughout the selected interval during which the product is being filled into the bag.

6. A vertical bottom-fill auger assembly for use in de-aerating a product and filling a target weight of said product into a bag, said vertical bottom-fill auger assembly comprising:
    a frame assembly;
    a bottom-fill auger assembly, said bottom-fill auger assembly being connected to and supported by said frame assembly, said bottom-fill auger assembly including a auger hopper having an open bottom and a fill tube depending from and connected to said auger hopper and communicating with said open bottom, said fill tube having a length and a bottom end, said fill tube having a spout assembly connected thereto adjacent said bottom end, said bottom-fill auger assembly further including an auger shaft having a section of flighting, said auger shaft having an axis of rotation oriented in a generally vertical direction, said auger shaft extending downwardly within said auger hopper and being received within said fill tube such that said section of flighting extends substantially through said length of said fill tube and terminating proximate to said bottom end, said section of flighting compressing and de-aerating the product within said fill tube to maintain a generally uniform product density as the product is discharged from said bottom end of said fill tube;

an auger shaft drive means, said auger shaft drive means being connected to said auger shaft and capable of controllably rotating said auger shaft and said section of flighting in a predetermined direction at a selected rate of revolution about said axis of rotation;

means for determining an approximate weight of the product which has been filled into the bag at a selected time concurrent with or prior to a selected interval during which said approximate weight of the product is being filled into the bag;

means for counting an approximate number of revolutions of said auger shaft during said selected interval;

means for determining an approximate flow density of the product within said fill tube, said approximate flow density being expressible in units weight of product per auger revolution; and means for determining an estimated of the product filled at a particular time during said selected interval, the difference between said estimated weight of the product filled and said approximate weight of the product in the bag being generally equal to an in-flight weight of the product between said fill tube and a product level within the bag, said in-flight weight being related to said number of revolutions of said auger shaft and said approximate flow density of the product by a mathematical formula, whereby the in-flight weight of the product is added to the approximate weight of product within the bag at the particular time to obtain a resultant total weight, and said resultant total weight at the particular time is compared to the target weight, the resultant total weight being less than or equal to the target weight by a weight difference, and whereby the flow density of the product within the fill tube is determined by comparing the approximate weight to the number of auger revolutions prior to the particular time, and whereby a number of auger revolutions necessary to fill said weight difference of the product into the bag is determined, the auger shaft being rotated said number of auger revolutions necessary to fill said weight difference of the product into the bag such that the bag contains the target weight of the product.

7. A vertical bottom-fill auger assembly for use in de-aerating a product and filling a target weight of said product into a bag, said vertical bottom-fill auger assembly comprising:

frame assembly;

a bottom-fill auger assembly, said bottom-fill auger assembly being connected to and supported by said frame assembly, said bottom-fill auger assembly including an auger hopper having an open bottom and a fill tube depending from and connected to said auger hopper and communicating with said open bottom, said fill tube having a length and a bottom end, said fill tube having a spout assembly connected thereto adjacent said bottom end, said bottom-fill auger assembly further including an auger shaft having a section of flighting, said auger shaft having an axis of rotation oriented in a generally vertical direction, said auger shaft extending downwardly within said auger hopper and being received within said fill tube such that said section of flighting extends substantially through said length of said fill tube and terminating proximate to said bottom end, said section of flighting compressing and de-aerating the product within said fill tube to maintain a generally uniform product density as the product is discharged from said bottom end of said fill tube;

an auger shaft drive means, said auger shaft drive means being connected to said auger shaft and capable of controllably rotating said auger shaft and said section of flighting in a predetermined direction at a selected rate of revolution about said axis of rotation;

means for determining an approximate weight of the product which has been filled into the bag at a selected time concurrent with or prior to a selected interval during which said approximate weight of the product is being filled into the bag;

means for counting an approximate number of revolutions of said auger shaft during said selected interval;

means for determining an approximate flow density of the product within said fill tube, said approximate flow density being expressible in units of weight of product per auger revolution; and means for determining an estimated weight of the product filled at a particular time during said selected interval, the difference between said estimated weight of the product filled and said approximate weight of the product in the bag being generally equal to an in-flight weight of the product between said fill tube and a product level within the bag, said in-flight weight being related to said number of revolutions of said auger shaft and said approximate flow density of the product in said fill tube and said approximate weight by a mathematical formula, whereby the estimated weight of the product within the bag at the particular time is compared to the target weight, the estimated weight being less than or equal to the target weight by a weight difference, and whereby the flow density of the product within the fill tube is determined by comparing the approximate weight to the number of auger revolutions prior to the particular time, and whereby a number of auger revolutions necessary to fill said weight difference of the product into the bag is determined, the auger shaft being rotated said number of auger revolutions necessary to fill said weight difference of the product into the bag such that the bag contains the target weight of the product.

* * * * *